United States Patent
Zhang et al.

(10) Patent No.: US 9,336,430 B2
(45) Date of Patent: May 10, 2016

(54) COMPUTER-ASSISTED KARYOTYPING

(71) Applicant: HEALTH DISCOVERY CORPORATION, Atlanta, CA (US)

(72) Inventors: Hong Zhang, Savannah, GA (US); Maher Albitar, Valley Center, CA (US)

(73) Assignee: Health Discovery Corporation, Atlanta, GA (US)

( * ) Notice: Subject to any disclaimer, the term of this patent is extended or adjusted under 35 U.S.C. 154(b) by 133 days.

(21) Appl. No.: 13/922,184

(22) Filed: Jun. 19, 2013

(65) Prior Publication Data
US 2014/0016843 A1    Jan. 16, 2014

Related U.S. Application Data

(60) Provisional application No. 61/661,796, filed on Jun. 19, 2012.

(51) Int. Cl.
*G06K 9/00* (2006.01)
(52) U.S. Cl.
CPC .......... *G06K 9/00147* (2013.01); *G06K 9/0014* (2013.01); *G06K 9/00127* (2013.01)
(58) Field of Classification Search
None
See application file for complete search history.

(56) References Cited

U.S. PATENT DOCUMENTS

| | | | |
|---|---|---|---|
| 5,649,068 A | 7/1997 | Boser et al. | |
| 6,128,608 A | 10/2000 | Barnhill | |
| 6,157,921 A | 12/2000 | Barnhill | |
| 6,427,141 B1 | 7/2002 | Barnhill | |
| 6,658,395 B1 | 12/2003 | Barnhill | |
| 6,714,925 B1 | 3/2004 | Barnhill et al. | |
| 6,760,715 B1 * | 7/2004 | Barnhill et al. | 706/16 |
| 6,789,069 B1 * | 9/2004 | Barnhill et al. | 706/12 |
| 6,882,990 B1 | 4/2005 | Barnhill et al. | |
| 6,996,549 B2 * | 2/2006 | Zhang et al. | 706/16 |
| 7,117,188 B2 | 10/2006 | Guyon et al. | |
| 7,383,237 B2 | 6/2008 | Zhang et al. | |
| 2003/0072477 A1 | 4/2003 | Kotwaliwale | |
| 2009/0204557 A1 | 8/2009 | Zhang | |
| 2011/0317904 A1 | 12/2011 | Zhu et al. | |
| 2013/0216118 A1 | 8/2013 | Rogan et al. | |

OTHER PUBLICATIONS

Wang, Xingwei, et al. "Automated identification of abnormal metaphase chromosome cells for the detection of chronic myeloid leukemia using microscopic images." Journal of biomedical optics 15.4 (2010): 046026-046026.*
Kao, Jau Hong, Jen Hui Chuang, and Tsai Pei Wang. "Automatic chromosome classification using medial axis approximation and band profile similarity." Computer Vision—ACCV 2006. Springer Berlin Heidelberg, 2006. 274-283.*

(Continued)

*Primary Examiner* — Utpal Shah
(74) *Attorney, Agent, or Firm* — Eleanor Musick (57) ABSTRACT

A system and method for computer-assisted karyotyping includes a processor which receives a digitized image of metaphase chromosomes for processing in an image processing module and a classifier module. The image processing module may include a segmenting function for extracting individual chromosome images, a bend correcting function for straightening images of chromosomes that are bent or curved and a feature selection function for distinguishing between chromosome bands. The classifier module, which may be one or more trained kernel-based learning machines, receives the processed image and generates a classification of the image as normal or abnormal.

25 Claims, 10 Drawing Sheets

(56) References Cited

OTHER PUBLICATIONS

Wu, Qiang, and Kenneth R. Castleman. "Automated chromosome classification using wavelet-based band pattern descriptors." Computer-Based Medical Systems, 2000. CBMS 2000. Proceedings. 13th IEEE Symposium on. IEEE, 2000.*

Karvelis, P. S., et al. "Enhancement of the classification of multichannel chromosome images using support vector machines." Engineering in Medicine and Biology Society, 2009. EMBC 2009. Annual International Conference of the IEEE. IEEE, 2009.*

Markou, Christoforos, et al. "Automatic Chromosome Classification using Support Vector Machines." 2012.*

Comaniciu, D. and Meer, P., "Mean Shift: A Robust Approach Toward Feature Space Analysis", IEEE Trans. on Pattern Analysis and Machine Intelligence, May 2002, vol. 24, No. 5, pp. 603-619.

Piper, J. and Granum, E., "On Fully Automatic Feature Measurement for Banded Chromosome Classification" Cytometry, 1989, vol. 10, pp. 242-255.

Mumthas, T.K., et al., "Karyotyping of Human Chromosomes Using M_FISH Images", International Journal of Management & Information Technology, Jul. 2013, vol. 4, No. 2, pp. 248-256.

Roshtkhari, M.J., et al., "A novel algorithm for straightening highly curved images of human chromosome", Pattern Recognition Letters, Feb. 2008, vol. 29, pp. 1208-1217.

Wang, X. et al., "Automated classification of metaphase chromosomes: Optimization of an adaptive computerized scheme", Journal of Biomedical Informatics, May 2008, vol. 42, pp. 22-31.

International Search Report and Written Opinion of the International Searching Authority, PCT/US2013/046659, Oct. 18, 2013.

* cited by examiner

COMPUTER-ASSISTED KARYOTYPING

RELATED APPLICATIONS

The present application claims the benefit of the priority of U.S. Provisional Application No. 61/661,796, filed Jun. 19, 2012.

FIELD OF THE INVENTION

The invention relates to a system and method for analysis of genetic material for identification of possible chromosomal abnormalities.

BACKGROUND

Altered DNA copy number is one of the many ways that gene expression and function may be modified. Some variations can be found among normal individuals, others occur in the course of normal processes in some species, and still others participate in causing various disease states. For example, many defects in human development are due to gains and losses of chromosomes and chromosomal segments that occur prior to or shortly after fertilization, whereas DNA dosage alterations that occur in somatic cells are frequent contributors to cancer. Therefore, detection of such aberrations, and interpreting them within the context of broader knowledge, facilitates identification of critical genes and pathways involved in biological processes and diseases, and provides clinically relevant information, such as in identifying efficacious drug regimes.

In normal diploid organisms, autosomal chromosomes are present in two identical copies, although polyploid cells have multiple copies of chromosomes and haploid cells have single copies. The chromosomes are arranged and displayed (often on a photo) in a standard format known as an idiogram: in pairs, ordered by size and position of centromere for chromosomes of the same size. Karyotypes are used to study chromosomal aberrations, and may be used to determine other macroscopically visible aspects of an individual's genotype, such as sex. In order to be able to see the chromosomes and determine their size and internal pattern, they are chemically labeled with a dye ("stained"). The resulting pattern of individual chromosomes is called chromosome banding. One of the most common staining methods is called "G-banding." Other staining methods are available to help identify specific abnormalities.

Visualization of human chromosomes in somatic cells requires that dividing cells be studied during mitosis. Large numbers of metaphase cells can best be obtained by growing cells in culture and adding spindle poisons to cell cultures during periods of active growth to arrest cells in metaphase. While the number of cells found in metaphase will increase with increased exposure to the spindle poison, chromosome condensation also progresses with time. A key element in the preparation of analyzable chromosome spreads is the degree of dispersion of the chromosomes on the microscope slide. The ideal metaphase spread has all 46 chromosomes dispersed in the same optical field under the microscope, with no overlapping chromosomes. For clinical study, it is desirable to find at least 20-30 analyzable metaphase chromosome cells for each patient. Since not all cells are engaged in cell division, and not all cells are in the metaphase stage, the cytogenic technologist must frequently examine a large number of cells under multiple microscope objectives to find a sufficient number of analyzable cells, looking at as many as 5-10 slides. Once the analyzable cells are identified, the standard procedure is to photograph, or digitize onto computer media, the entire metaphase spread, cut out the individual chromosomes (actually or electronically), and arrange the chromosomes in a standard karyotype where both homologues of each chromosome pair placed side by side in numerical order. Frequently, the chromosomes in metaphase images are bent or curved so that, prior to separating and arranging the chromosome images for comparison, they must be reshaped into a generally straight line. In order to complete this step, the images must be further manipulated to allow side-by-side comparison. Thus, a great deal of time is required before even reaching the point at which evaluation of the sample for abnormalities can begin.

Once the images are properly arranged in this manner, band-by-band analysis can be performed, allowing identification of changes caused by structural chromosome abnormalities. The number of bands that are discernible in a single metaphase chromosome spread may vary from under 300 to approximately 1,400. Multiplied by 20 or 30, the entire process becomes an extremely labor-intensive, lengthy and inefficient process that can introduce critical delays in the treatment of patients as well as inconsistencies in diagnostic performance due to inter- and intra-reader variability. Accordingly, there is a need for a system and method to significantly speed up and improve the repeatability of the process of searching for and identifying analyzable chromosomes, and analyzing the chromosomes for abnormalities. An automated computer system capable of processing metaphase images, separating chromosomes, and detecting chromosome abnormalities would greatly enhance the usefulness, cost-effectiveness and availability of cytogenetic diagnostic testing. The present invention is directed to such a system and method.

BRIEF SUMMARY

According to the invention, a system and method are provided for pre-processing digitized metaphase images to extract and straighten individual chromosome images, arrange the images into a standard karyotype, to profile the banding patterns and to extract relevant features. After pre-processing, the data is processed using a trained kernel-based learning machine to classify the images according to length, centromere location, banding pattern (intensity and location of bands) to classify normal versus abnormal chromosomes. The classifier may also be used to evaluate the similarities among multiple metaphases in a longitudinal manner.

In an exemplary embodiment, the kernel-based learning machine is a support vector machine (SVM), but other machine learning methods may be used. In a preferred embodiment, multiple learning machines may be used, with at least one SVM or other learning machine used for each chromosome or group of chromosomes. An optional second layer classifier may be trained to receive and combine the outputs of each of the separate chromosome classifiers to generate a single output with a result of the overall analysis, providing a diagnostic conclusion or other evaluation of the combined information obtained from the metaphase image.

The kernel-based learning machines may be trained to recognize abnormalities including deletions (missing a piece of the chromosomes), additions, amplifications or duplications (increase in a segment, duplication or multiple copies of a segment), translocations (transposition of a segment of one chromosome to another) and abnormalities in the number of chromosomes (adding or deleting a whole chromosome or a part of it).

According to the present invention, pre-processing steps may include filtering for noise reduction, segmentation to separate objects of interest, i.e., the chromosomes from each other, bending curve correction, image registration and feature extraction. The pre-processing steps may also include the use of learning machines to classify the data for extracting the optimal features of interest for use in the chromosome analysis. For example, learning machines may be used in the initial digital image analysis for noise reduction while still preserving the relevant data for the decision process.

The underlying system and process used in the present invention are disclosed in U.S. Pat. No. 6,996,549, assigned to the present applicant, which is incorporated herein by reference.

In one aspect of the invention, a method is provided for computer-assisted karyotyping, the steps including inputting a digitized image of metaphase chromosomes into a processor comprising an image processing module and a classifier module, wherein the image processing module comprises: a segmenting function adapted for segmenting the digitized image for extracting individual chromosome images; a bend correcting function adapted to straightening images of chromosomes that are bent or curved; a feature selection function adapted for distinguishing between chromosome bands; wherein the classifier module generates a classification of the image as normal or abnormal and generates an output therefrom. In an exemplary embodiment, the classifier module comprises at least one support vector machine. In a preferred embodiment, the classifier module comprises a plurality of support vector machines, wherein each support vector machine classifies a different group of chromosomes. The classifier module may further include a combined support vector machine for receiving an output of each of the plurality of support vector machine to generate a combined result for all chromosomes. The image processing module may include a medial axis transform function for generating a topological skeleton corresponding to a chromosome image. The feature selection function may be one or more functions selected from the group consisting of Fourier analysis, wavelet transform and 3D distance function. The segmenting function may include finding contours of chromosome in the image.

In another aspect of the invention, a system is provided for computer-assisted karyotyping, the system including: a data storage device for receiving and storing digitized images of metaphase chromosomes; a processor in communication with the data storage device comprising an image processing module and a classifier module, wherein the image processing module comprises: a segmenting function adapted for segmenting the digitized image for extracting individual chromosome images; a bend correcting function adapted to straightening images of chromosomes that are bent or curved; a feature selection function adapted for distinguishing between chromosome bands; an output device in communication with the processor for displaying an output comprising a classification of the image as normal or abnormal. In an exemplary embodiment, the classifier module comprises at least one support vector machine. In a preferred embodiment, the classifier module comprises a plurality of support vector machines, wherein each support vector machine classifies a different group of chromosomes. The classifier module may further include a combined support vector machine for receiving an output of each of the plurality of support vector machine to generate a combined result for all chromosomes. The image processing module may include a medial axis transform function for generating a topological skeleton corresponding to a chromosome image. The feature selection function may be one or more functions selected from the group consisting of Fourier analysis, wavelet transform and 3D distance function. The segmenting function may include finding contours of chromosome in the image.

In still another aspect of the invention, a non-transitory machine-readable medium is provided, which includes a plurality of instructions that, in response to being executed, result in a computing system executing an automated karyotyping process, including: receiving a digitized image of metaphase chromosomes into a processor comprising an image processing module and a classifier module, wherein the image processing module comprises: a segmenting function adapted for segmenting the digitized image for extracting individual chromosome images; a bend correcting function adapted to straightening images of chromosomes that are bent or curved; a feature selection function adapted for distinguishing between chromosome bands; classifying the processed image from the image processing module to separate normal and abnormal; and outputting a report to a display device, the report comprising a classification of the image as normal or abnormal. In an exemplary embodiment, the classifier module comprises at least one support vector machine. In a preferred embodiment, the classifier module comprises a plurality of support vector machines, wherein each support vector machine classifies a different group of chromosomes. The classifier module may further include a combined support vector machine for receiving an output of each of the plurality of support vector machine to generate a combined result for all chromosomes. The image processing module may include a medial axis transform function for generating a topological skeleton corresponding to a chromosome image. The feature selection function may be one or more functions selected from the group consisting of Fourier analysis, wavelet transform and 3D distance function. The segmenting function may include finding contours of chromosome in the image.

DETAILED DESCRIPTION

Figure 1:
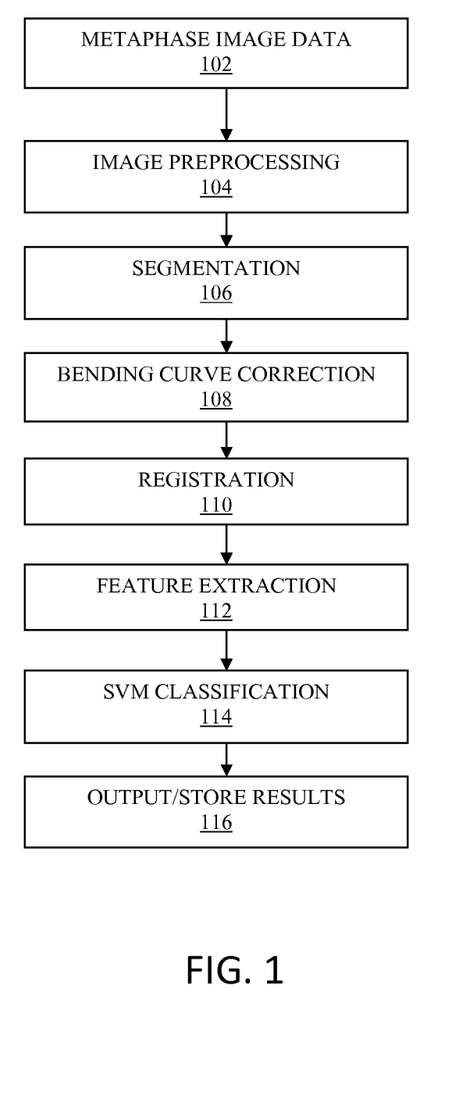
FIG. 1 is a flow diagram showing the overall architecture/process flow of the inventive system.
Figure 2:
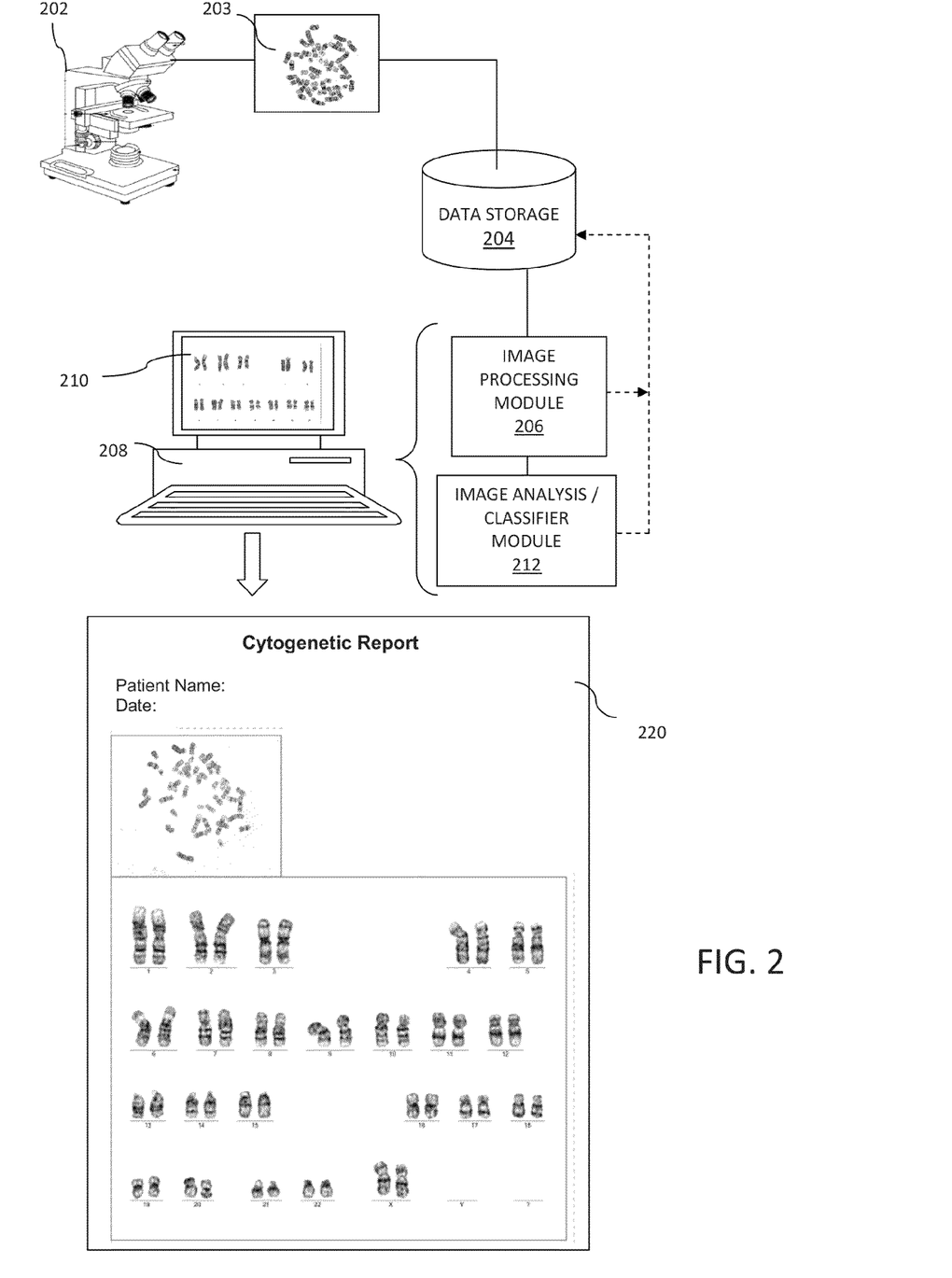
FIG. 2 is a diagrammatic view of a system for computer-aided analysis of chromosome images.

FIGS. 1 and 2 illustrate the process flow and components of the inventive method and system for computer-assisted karyotyping. The input image data 102 is a digitized image obtained during microscope inspection of cells in metaphase. The image is pre-processed in step 104 to reduce noise and eliminate image artifacts. The denoised image is segmented in step 106 to separate the objects of interest (the chromosomes) from the background. After the individual chromosomes have been separated, the chromosomes that are bent or curved are identified and processed in step 108 to straighten them to allow the bands to be readily discerned. After the chromosomes have been straightened, in step 110, they may be compared longitudinally to determine similarity. (Comparisons may be made within metaphases or between multiple metaphases.) Feature extraction step 112 distinguishes among the bands based on intensity and location. Once the bands have been identified, the classification can be performed in step 114. In one embodiment, multiple support vector machines may be used. For example, a SVM may be trained for each chromosome or group of chromosomes. In step 116, the classification results may then be output to a display device and/or stored in a memory device or medium.

FIG. 2 illustrates an exemplary system for computer-assisted karyotyping. Slides are scanned using a microscope 202 which may have a built in or separate camera for generating a digital image of the metaphase chromosomes. The image 203 may be selected as part of an automated scanning process or may be selected by a cytology technician who is reviewing the slide to identify appropriate cells for analysis. The digital metaphase image 203 may be stored in a database 204 that is in communication with a computer processor 208 which includes a programming module for executing image processing operations 206, which may include steps 104, 106, 101, 110 and 112, and a module 212 for executing one or more learning machine classifiers. The images generated by the image processing module may be displayed on a high-definition display 210 to allow the cytology technician or cytologist to conduct a separate evaluation of the karyotypes. The outputs of the image processing module 206 and classifier module 212 may be stored in the database 204 along with the raw image data 203. The processor 208 may also include software for generating a report 220, which may also be stored with the raw image and intermediate processing results.

The following description provides details of individual processing steps that may be used in conjunction with the inventive system and method. As will be apparent to those of skill in the field of image processing, many of the individual algorithms described herein are well documented methods on their own, but have not previously been combined in the manner described for computer-assisted karyotyping.

Image Pre-Processing (Step 104)

Mean shift filtering is a data clustering algorithm commonly used in computer vision and image processing for damping shading or tonality differences in localized objects. For each pixel of an image (having a spatial location and a particular color or grayscale level), the set of neighboring pixels (within a spatial radius and a defined color distance) is determined. For this set of neighbor pixels, the new spatial center (spatial mean) and the new color mean value are calculated. These calculated mean values will serve as the new center for the next iteration. The described procedure will be iterated until the spatial and the color (or grayscale) mean stops changing. At the end of the iteration, the final mean color will be assigned to the starting position of that iteration. The mean-shift filtering technique smoothes an image while preserving discontinuity. It is effective in reducing noise without losing useful boundary features.

Figure 3:
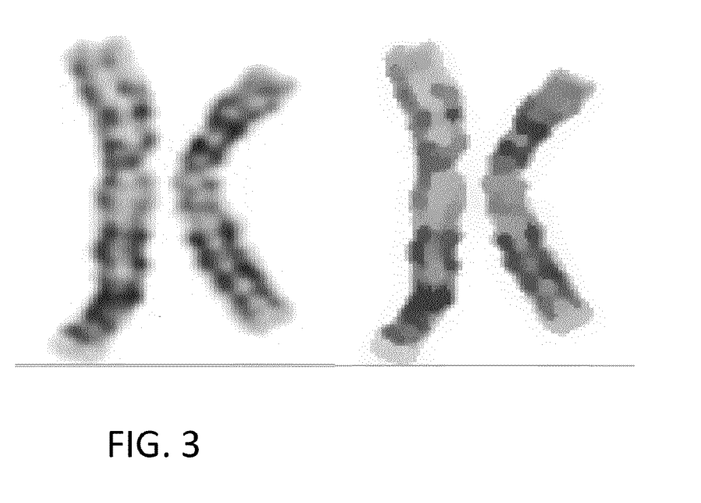
FIG. 3 illustrates an example of mean-shift filtering for noise reduction.

FIG. 3 illustrates an example of the effects of mean-shift filtering, with the original image on the left and the filtered image on the right.

Segmentation (Step 106)

Segmentation is a basic image processing technique that separates the objects from the background in an image. In this project, segmentation will isolate the individual chromosomes. Even though segmentation is only a preliminary processing step, the quality of the segmentation can directly affect the accuracy of system.

Figure 4:
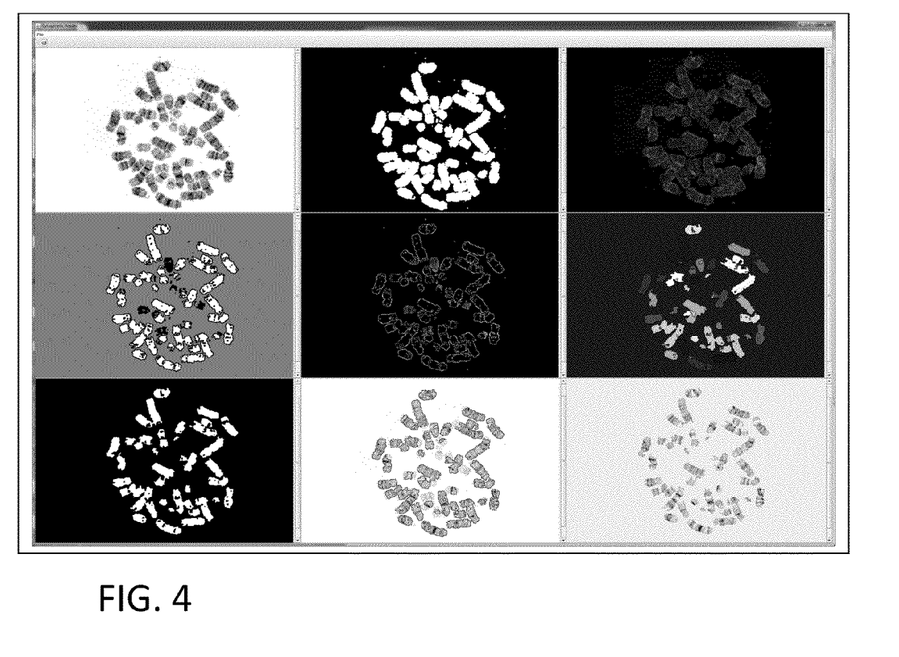
FIG. 4 illustrates different image operations related to image segmentation.
Figure 5:
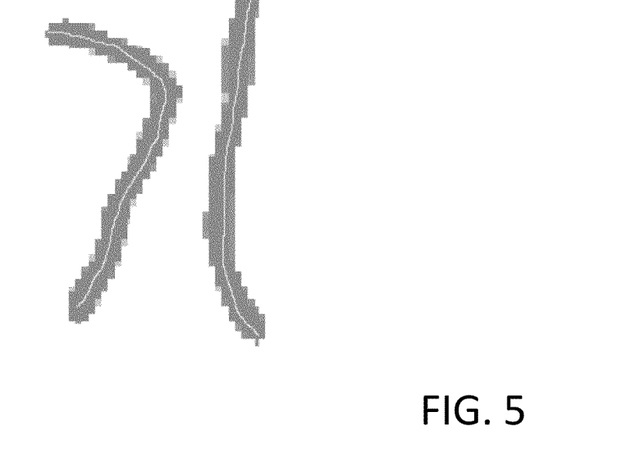
FIG. 5 shows an exemplary medial axis transform.

FIG. 4 illustrates different image operations related to segmentation, with the original starting image in the upper left of the screen shot. Image segmentation methods are well known in the art. Morphological operators, gradients, threshold operations, and other region and contour processing techniques may be employed as part of the image segmentation process.

We apply functions related to the curvature of a chromosome border to detect the telomeres and centromeres. The curvature is an intrinsic measure of a curve. For a continuous curve, $$k(s) = \frac{x'y'' - y'x''}{(x'^2 + y'^2)^{3/2}}$$

With a discrete curve, the curvature values directly calculated from the formula would be unstable because of differential operators. Several techniques may be applied to obtain stable results. A cumulative angular function derived from curvatures can be used to detect extreme values corresponding to telomeres and centromeres to allow segmentation of the individual chromosome images. Another useful function can be obtained from local averages of curvatures.

Figure 11:
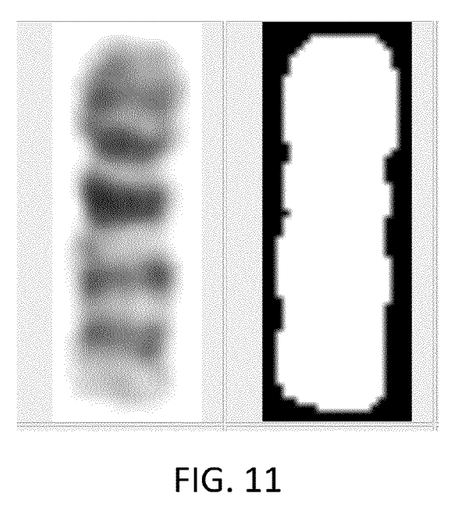
FIG. 11 shows a chromosome (left) and its contour (right).
Figure 12:
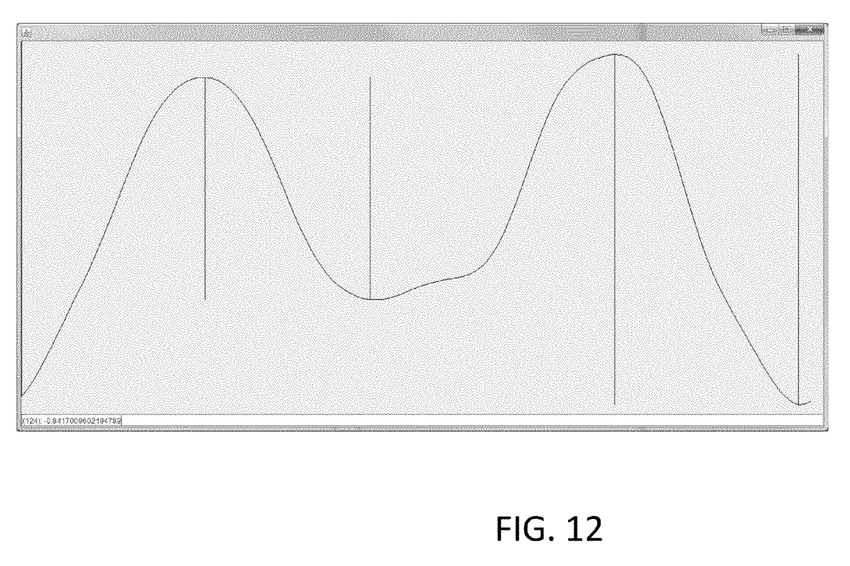
FIG. 12 is a plot of the smoothed curvature function and its extremes.

FIG. 11 shows a chromosome (left) and its contour (right). FIG. 12 is a plot of the smoothed curvature function and its extremes.

Bending Curve Correction (Step 108)

Chromosomes in metaphase images can often be bent or curved. We developed an algorithm to automatically detect this bending and to straighten the chromosomes. The basic approach is to approximate this bending transformation by using a complex polynomial least squares fitting. The fitted polynomial represents a conformal mapping from the space of ideal object to the actual image space. A restored image can be created by mapping the coordinates in the ideal space to the image and interpolating the pixel values.

A complex function $f: C \rightarrow C$ can be viewed as a transformation in $R^2$. A complex analytic function represents a smooth transformation known as a conformal mapping, which preserves angles. A polynomial with complex coefficients is a special case of analytic functions:

$$f(z) = \sum_{j=0}^{n} c_j z^j$$

$$c_j = a_j + ib_j, j = 0, 1, \ldots, n$$

Since an analytic function has a power series expansion at any point in its domain, polynomials can be used to approximate a conformal mapping. The curve fitting problem with complex polynomials is similar to the case with real polynomials. Given a set of complex points $(z_1, z_2, \ldots, z_m)$ and an associated target set of complex points $(w_1, w_2, \ldots, w_m)$, the objective of the least squares fitting is to find a complex polynomial $f(z)$ that minimizes the sum of squared residuals:

$$S = \frac{1}{2}\sum_{k=1}^{m} |f(z_k) - w_k|^2$$

To simply the notation, we define the following matrices:

$$Z = \begin{pmatrix} 1 & z_1 & \cdots & z_1^n \\ 1 & z_2 & \cdots & z_2^n \\ & \cdots & \\ 1 & z_m & \cdots & z_m^n \end{pmatrix} \quad c = \begin{pmatrix} c_0 \\ c_1 \\ \vdots \\ c_n \end{pmatrix} \quad w = \begin{pmatrix} w_1 \\ w_2 \\ \vdots \\ w_m \end{pmatrix}$$

Then S can be written as $$S = \frac{1}{2}\overline{(Zc - w)^T}(Zc - w)$$

By considering S as a function of the real variables $a_j$ and setting the derivatives to 0, we have $Re\{\overline{Z^T}(Zc-w)\}=0$ Similarly by taking the derivatives of S with respect to the real variables $b_j$ and setting them to 0, we have $Re\{\overline{Z^T}(Zc-w)i\}=0$ which is equivalent to $Im\{\overline{Z^T}(Zc-w)\}=0$ Therefore, the least squares solution should satisfy the linear equation:

$\overline{Z^T}(Zc-w)=0$ or $\overline{Z^T}Zc=\overline{Z^T}w$

Another way to derive the equation is to consider w as a vector in the complex vector space $C^m$, and the column space of Z as a subspace. The minimization of S is to minimize the distance from w to the subspace, which is attained at Pw, the perpendicular projection of w into the subspace. The equation above specifies the orthogonality between w−Pw and the subspace.

Medial Axis Transform:

A medial axis transform (MAT) may be used to extract the medial axis (skeleton) of a chromosome. The resulting skeleton is typically in the form of a binary image. An example is shown in FIG. 4. The skeleton/MAT can be produced in two main ways. The first is to use a form of morphological thinning that successively erodes away pixels from the boundary while preserving the end points of line segments until no more thinning is possible. At this point what is left approximates the skeleton. An alternative method is to first calculate the distance transform of the image. The skeleton then lies along the singularities, i.e., creases or curvature discontinuities, in the distance transform. This latter approach may be more suited to calculating the MAT since the MAT is the same as the distance transform but with all points off the skeleton suppressed to zero.

For the computer system to understand the structure of the skeleton, a model containing topological information is crucial. In the preferred embodiment, a graph model is used to represent the skeleton, which will be a tree consisting of nodes and edges, i.e., a connected acyclic graph, corresponding to a chromosome image. This approach is based on the work by Blum ("A Transformation for Extracting New Descriptors of Shape", *Models for the Perception of Speech and Visual Form*, pages 362-380, MIT Press, 1967.) The level of a node is defined as how close it is to the center of the tree, where a center is a vertex u such that the maximum value of the distances between the vertex u and all other vertices is a minimum. As is known to those of skill in the art, information such as adjacency, degrees of vertices, and distances can be easily retrieved in the model. See, also, Laymarie and Kimia, "From the Infinitely Large to the Infinitely Small: Applications of Medial Symmetry Representations of Shape", Chapter 11 of *Medial Representations: Mathematics, Algorithms and Applications*, Editors K. Siddiqi and S. M. Pizer, Kluwer, 2006. To extract the corresponding points associated with the bending, we use the graph model of the medial axis (skeleton) of the chromosome. The skeleton will condense the object to a curve, which provides a convenient representation of the bending.

Figure 6:
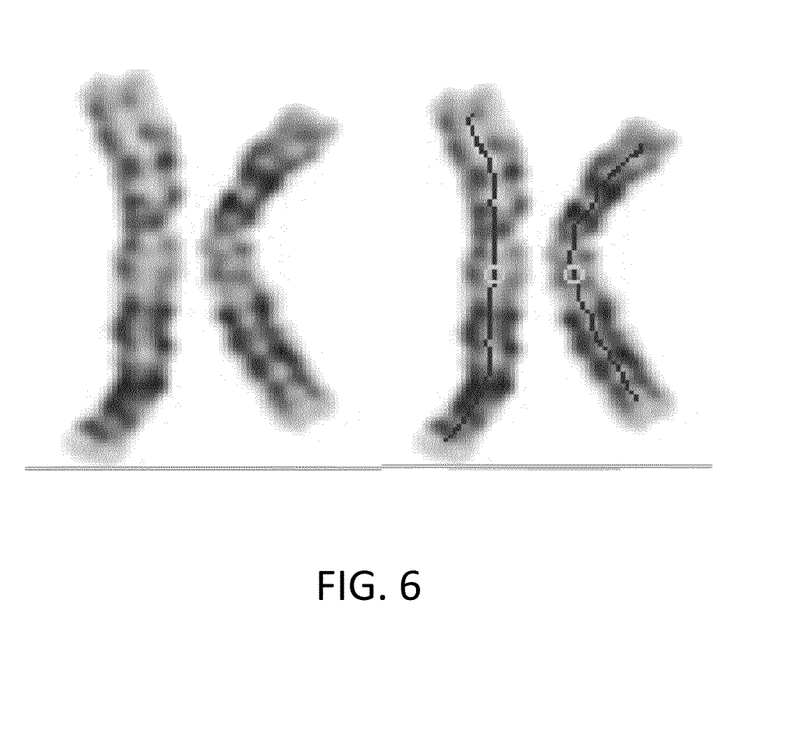
FIG. 6 illustrates the skeleton curves produced using thinning and skeleton algorithms from segmented regions of a chromosome image.
Figure 7:
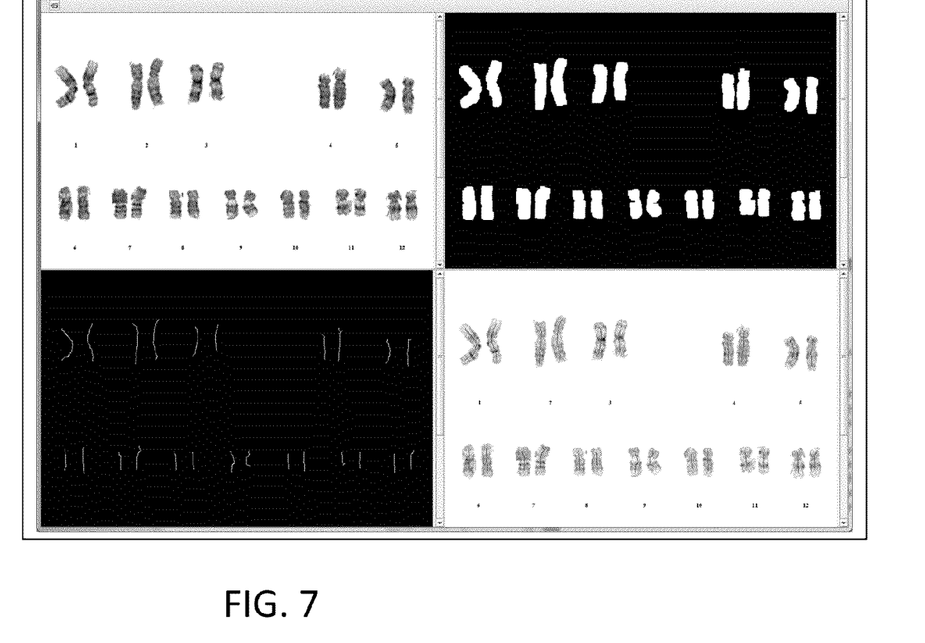
FIG. 7 is an image of a screen display illustrating a series of steps in identification of the medial axis or topographical skeleton.

FIG. 6 shows the results of thinning and skeleton algorithms used to produce the skeleton curve from the segmented regions of the chromosome images. FIG. 7 is a simulated screen shot showing an exemplary sequence of steps that may be used to extract the skeleton or medial axis from the segmented images. As shown, the original images (after segmentation) are shown in the upper left, the contours for each chromosome are shown in the upper right, the MAT for each chromosome is shown in the lower left, and the corresponding topological skeletons are shown in the lower right.

For the cytogenetics reader, the key features are related to the banding patterns in the chromosomes. Because the chromosomes in an image may be bent in a variety of different ways, it is important for the computer reader to detect the bending curves. The topological skeleton, or medial axis of a chromosome serves as a natural representation of such a curve.

Figure 8:
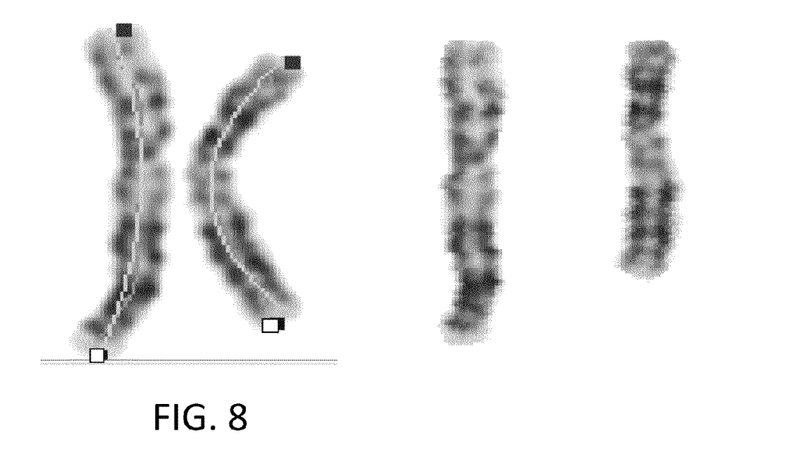
FIG. 8 shows the result of an exemplary bending correction as applied to the original image on the left.

FIG. 8 illustrates an example of the correction process. The medial axis, obtained from the skeleton algorithm, is discrete and not necessarily smooth. A smooth curve is constructed to fit the skeleton. While traversing the smoothed medial axis, at each point of the axis, a line segment in the direction normal to the axis is sampled. The results can be illustrated roughly as the "straightened" chromosomes in the right.

The curvature of a curve is defined as the derivative of the angle of the tangent line with respect to it arc length:

$$\kappa = \frac{d\theta}{ds} = \frac{x'y'' - y'x''}{(x'^2 + y'^2)^{3/2}}$$

The curvature is a natural measure of the curving characteristics of a curve. The well-known "four-vertex theorem" states that the curvature function of a simple, closed, smooth plane curve has at least four local extrema (specifically, at least two local maxima and at least two local minima).

Figure 9:
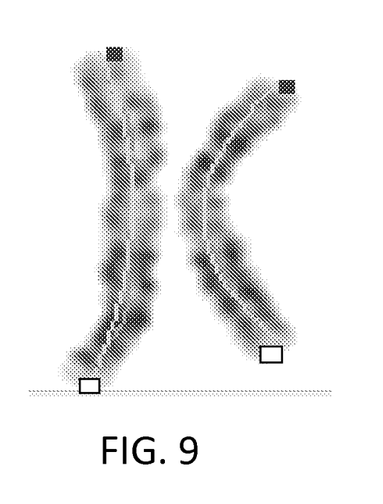
FIG. 9 shows an example of detection of the end points of chromosomes using their curvature functions.

FIG. 9 shows the detection of the end points of chromosomes using their curvature functions. After smoothing, the end points correspond to the local maxima of the contour curves.

Figure 13:
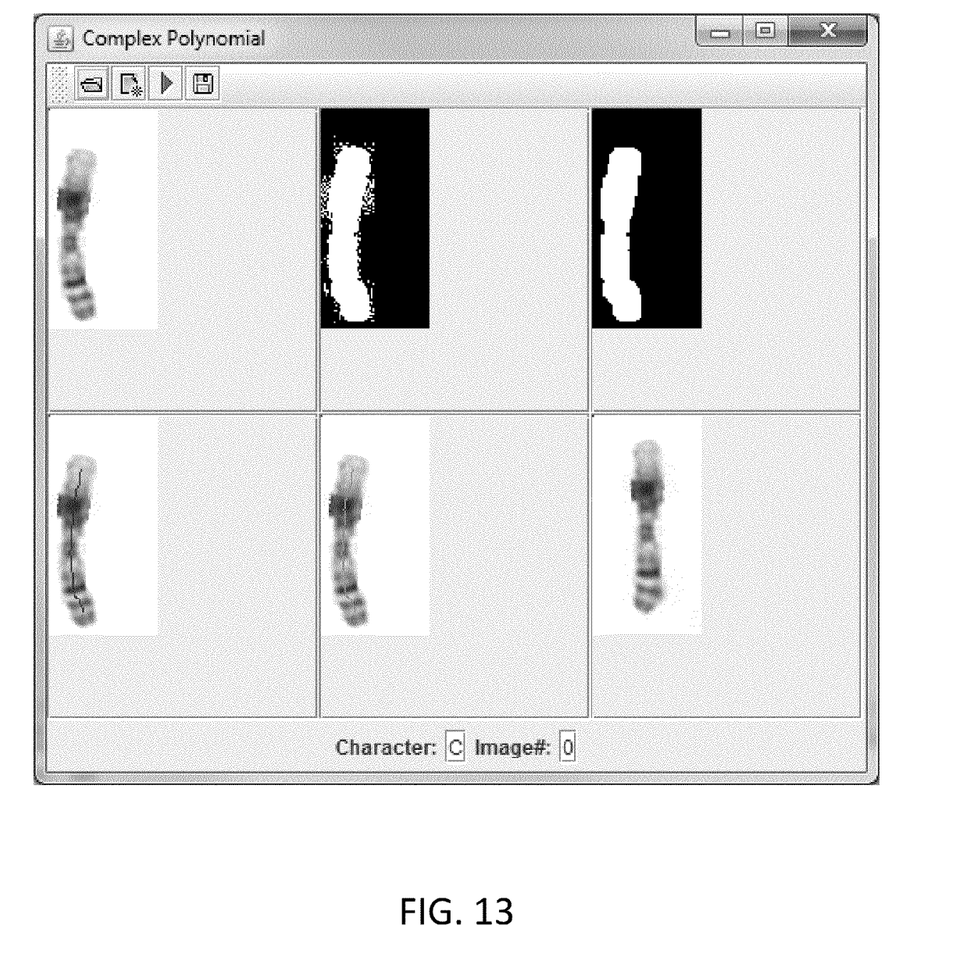
FIG. 13 is an example of application of an unbending algorithm to the original image of a chromosome shown in the top left panel.
Figure 14:
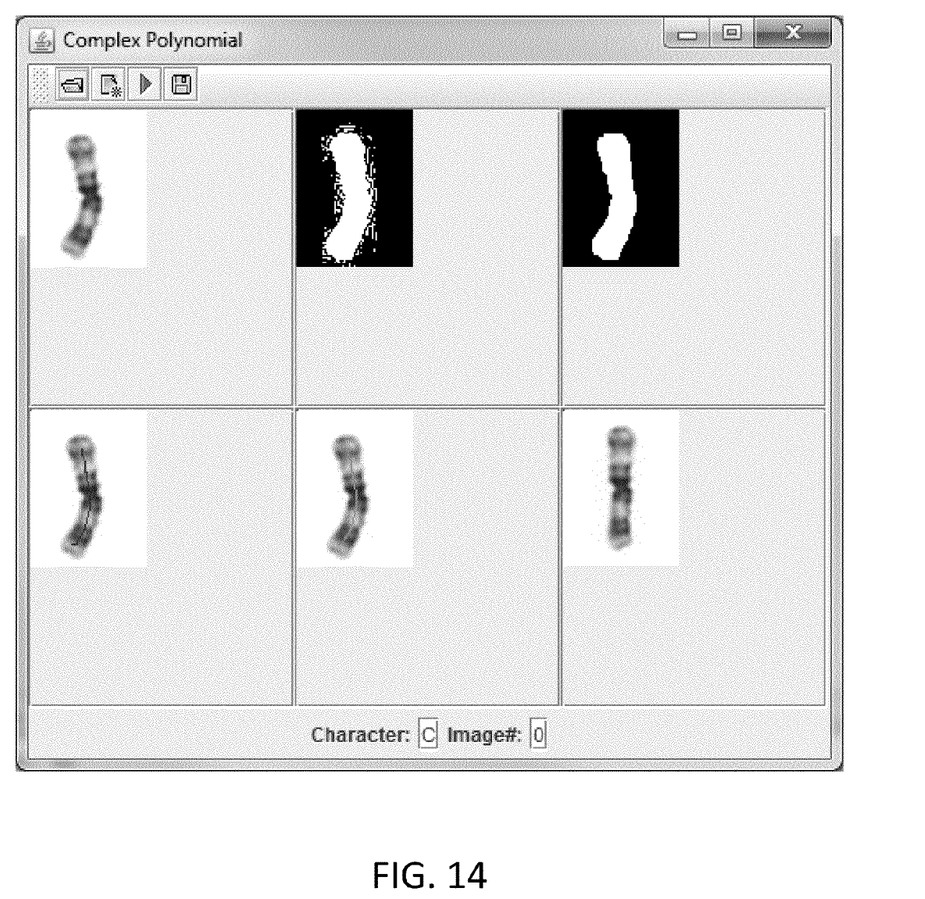
FIG. 14 is another example of application of an unbending algorithm to the original image of a chromosome shown in the top left panel.

The points on the skeleton are used as the vector ($w_1$, $w_2$, ..., $w_m$). The corresponding ($z_1$, $z_2$, ..., $z_m$) is taken from the points of a straight vertical line of the same length. Following the construction of the complex polynomial $f(z)$ through the least squares fitting, a restored image can be computed based on the actual image and the mapping. For each pixel coordinates (x, y) in the ideal space, compute the mapped value $f(x+iy)=w=u+iv$ in the image space. Because the coordinates (u, v) may not have integer values, a bi-linear interpolation is performed on the pixel values of four neighboring coordinates of (u, v). The result is set as the pixel value of the restored image at (x, y). FIGS. 13 and 14 provide examples of application of the algorithm to chromosomes. The original image is shown in the top left panel. The bottom right image shows the result of the unbending algorithm.

Registration (Step 110)

Markov random field (MRF) models have become useful in several areas of image processing, providing a basis for modeling contextual constraints in visual processing and interpretation. MRF is an n-dimensional random process defined on a discrete lattice (an undirected graph). Images are dissected into an assembly of nodes that may correspond to pixels or an agglomeration of pixels. Each edge represents dependency, so full conditional distribution depends only on the neighboring nodes in the lattice.

A Gibbs random field is characterized by the Gibbs distribution defined as $$P(X) = \frac{1}{Z} e^{U(X)/T}$$

where Z is a normalizing constant called the partition function, T is a constant called the temperature and U is the energy function. The energy $U(X) = \Sigma_{c \in C} V_c(X)$ is a sum of clique potentials Vc over all possible cliques in the lattice.

As is known in the art, the Hammersley-Clifford theorem establishes the equivalence of Markov random field and Gibbs random field.

Markov Chain Monte Carlo (MCMC) methods are sampling algorithms that provide efficient solutions to Markov random fields and other Bayesian type models.

The stochastic models and MCMC sampling methods are used to extract robust features from the segmented, medial axis normalized chromosome images. The advantages of this approach include noise resistance and the ability to incorporate prior information. Gibbs distributions, specified with associated energy functions, can be used to define the priors.

The two chromosomes in a pair are normally identical. The computer algorithm can take advantage of this symmetry in detecting abnormalities. This is a problem of image registration. There are many techniques in this area. A probabilistic model is designed to enhance the performance for this project. MCMC and Gibbs sampling may also be applied for implementing the registration.

An active contour model (also known as a "snake") is an energy-minimizing spline guided by external constraint forces and influenced by image forces that pull it toward features such as lines and edges. A snake is constructed as a curve that minimizes the energy functional:

$$E_{snake}* = \int E_{snake}(v(s))ds = \int E_{int}(v(s)) + E_{image}(v(s)) + E_{con}(v(s))ds$$

The internal energy controls the continuity of the spline and acts as a regularization term similar to a Tikonov stabilizer. The image energy and external constraint energy terms drive the curve to fit the image data.

Snakes are typically used in image processing and computer vision to obtain contours of objects from noisy images. We propose to use a snake-like model to fit the banding patterns in chromosomes. Instead of the contour, the energy functions may be defined to pull the key points of the snake to the bands in the chromosomes.

Feature Selection (Step 112)

A number of methods may be used for distinguishing the banding patterns of the chromosomes. These methods include a 3D distance function; Fourier analysis and wavelet transform.

3D Distance Function: One of the most important features in recognizing a chromosome is the banding patterns. We profile the banding patterns along the medial axis. It is crucial to accurately map the pixel values of the bands to the proper locations on the medial axis.

One straightforward approach is to use the shortest path with an ordinary 2D distance function for such a mapping. The problem with this method is the accuracy. The image can be noisy and the banding patterns are typically imperfect.

We defined a 3D distance function to address the problem. Besides the two dimensions from the image geometry, the pixel gray scale is used as the third dimension. This distance function will take into account not only the geometric distance between two pixels but also their gray scale values. Consequently, a shortest path will favor similar gray scales, which will have the desirable effects of preserving the bands.

Fourier Analysis: The Fourier analysis (including Fourier series, Fourier transform, and discrete Fourier transform) is a powerful tool in signal processing. Over a finite interval, the Fourier coefficients are defined as $$F_k = \int_0^T f(t) e^{2\pi k i/T} dt$$

The Fourier spectrum provides an orthogonal decomposition of the signal in frequencies. It is also useful in computing quantities such as the correlation between two signals.

We apply the Fourier analysis on the 1-D function of mean values in the normal directions over the medial axis. To compare the banding patterns of a pair of chromosomes, the inner product of their Fourier coefficients are computed to form a kernel value. Two versions of kernel computations are used to drive the SVM:

$$\left| \sum F_k G_k \right|$$

$$\sum |F_k G_k|$$

The Fourier approach offers several distinct advantages. The computation is stable and tolerant to small variations. The global structure of the chromosome patterns is well captured. This method is also computationally efficient.

Wavelet Transform: One potential disadvantage of the Fourier analysis is the lack of localization. The Fourier coefficients are dependent on the entire signal and do not reflect local characteristics well. Wavelet analysis provides an alternative to Fourier analysis with good localization property.

Applying wavelet to the chromosome banding functions may improve the accuracy of the analysis and comparison. The localization could provide a more precise representation especially when the banding is not uniformly spaced.

Learning Machine Classification (Step 114)

With the properly preprocessed data and extracted features, the decisions of the system can be made through a classifier. While a number of known learning machine methods may be used, in the preferred embodiment, a kernel based machine learning system such as a support vector machine is used.

Modern technological advancements have created a vast amount of data in many different forms. One of the greatest challenges presented to computer and information scientists by this information explosion is to develop effective methods to process large quantities of data and extract meaningful information. Traditional statistical methods, though effective on low dimensional data, have proven to be inadequate in processing the "new data" which are often characterized by high complexity and high dimensionality. In particular, the so called "curse of dimensionality" is a serious limitation on the classical statistical tools. Machine learning represents a promising new paradigm in data processing and analysis to overcome the limitations. It uses a "data-driven" approach to automatically "learn" a system using training data, which can be used to make classifications or predictions on future data. Support Vector Machine (SVM) is a state-of-the-art machine learning technology that has revolutionized the field of machine learning and has provided real, effective solutions to many difficult data analysis problems.

SVM combines the concepts of an optimal hyperplane in a high-dimensional inner product space (often an infinite-dimensional Hilbert space) and a kernel function defined on the input space to achieve the flexibility of data representations, computational efficiency, and regularization on model capacities. SVM can be used to solve both classification (pattern recognition) and regression (prediction) problems. A typical SVM pattern recognition setting is given below. Given a set of training data:

$$x_i, y_i \; i=1,2,\ldots,m$$

The SVM training can be formulated as a problem of finding an optimal hyperplane:

$$\min \frac{1}{2}\|w\|^2 + \frac{C}{m}\sum_{i=1}^{m} \xi_i, \; \xi_i \geq 0, \; y_i(\langle \Phi(x_i), w \rangle + b) \geq 1 - \xi_i$$

Using Lagrange multipliers, it is transformed to the dual problem:

$$\max \sum_{i=1}^{m} \alpha_i - \frac{1}{2}\sum_{i,j=1}^{m} \alpha_i \alpha_j y_i y_j k(x_i, x_j), \; \alpha_i \geq 0, \; \sum_{i=1}^{m} \alpha_i y_i = 0$$

Solving the quadratic programming problem, we have the SVM solution:

$$f(x) = \mathrm{sgn}\left(\sum_{i=1}^{m} \alpha_i y_i k(x, x_i) + b\right)$$

Figure 10:
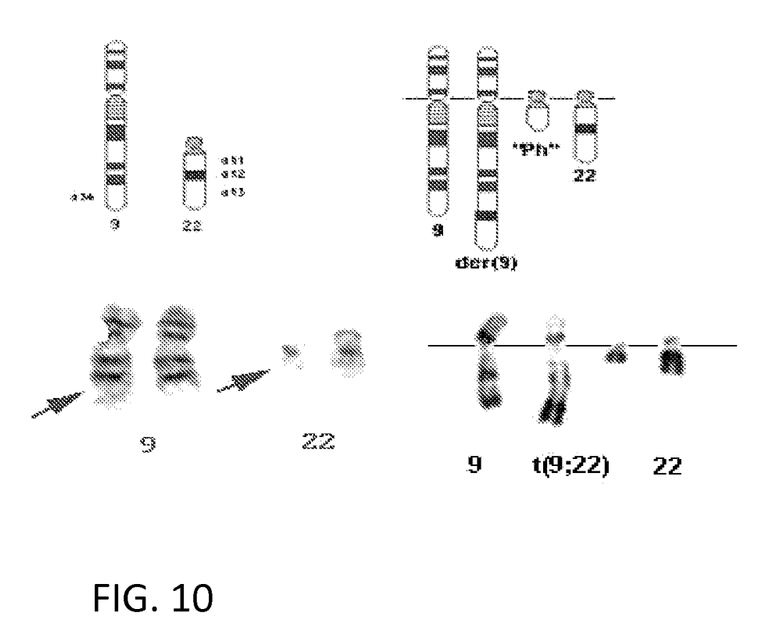
FIG. 10 shows exemplary translocation between chromosome 9 and 22, which is associated with chronic myelogenous leukemia.

FIG. 10 shows the translocation between chromosome 9 and 22, the famous Philadelphia chromosome, which is associated with chronic myelogenous leukemia.

In some embodiments, it may be beneficial to use multiple SVMs or other learning machines to allow optimization of the classifier to similar structures, e.g., chromosomes of similar lengths may be grouped together. For example, a classifier may be provided for each of groups A-G as officially adopted at the London Conference (1963). These groups are as follows:

Group A: chromosomes 1, 2, 3
Group B: chromosomes 4, 5
Group C: chromosomes 6, 7, 8, 9, 10, 11, 12
Group D: chromosomes 13, 14, 15
Group E: chromosomes 16, 17, 18
Group F: chromosomes 19, 20
Group G: chromosomes 21, 22

In an implementation of the inventive system, eight SVMs were used corresponding to the seven chromosome groups plus a group for the sex chromosomes. Each of the SVMs was trained and tested using metaphase images that had known outcomes. The main advantage of using multiple learning machine classifiers is the ability to target specific features in each group and optimize the classifier for the specific features. As will be readily apparent, the invention is not limited to eight classifiers. Rather, any appropriate grouping of chromosomes may be used, or one or more separate classifiers may be used for each chromosome. For example, 23 or more SVMs may be used, each optimized for an individual chromosome.

In addition to classifying the chromosomes within a single phase, the classifier may be used to compare the same number chromosome from different metaphases. The samples to be compared may either be for the same patient or a different patient, which may be particularly useful when studying hereditary genetic abnormalities within families or population genetics. The greatly accelerated analysis capability provided by the inventive system also provides the ability to automatically compare the results between different metaphases.

Figure 15:
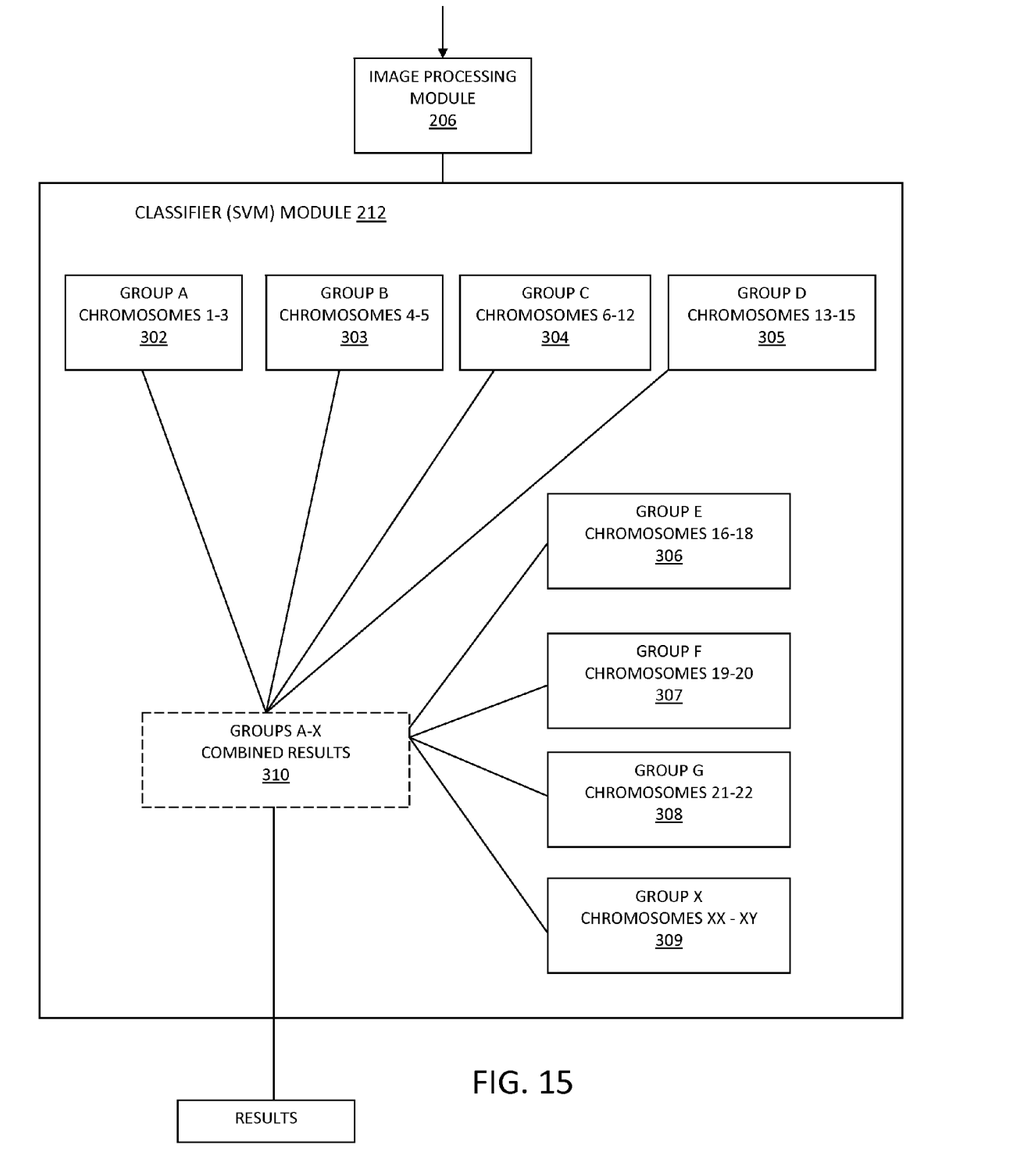
FIG. 15 is a block diagram showing the classifier module with multiple classifiers.

An optional overall (second level) classifier may be used to summarize the results of the individual chromosome, or chromosome group classifications may also be used to produce a single output reporting the combined results of the analysis. The overall classifier may also be used to generate a single analysis summary for multiple metaphases that have been compared. An exemplary platform for this type of analysis is described in U.S. Pat. No. 6,760,715, which is incorporated herein by reference. FIG. 15 illustrates an exemplary classifier (SVM) module 212, which receives processed images from image processing module 206. Within the classifier module 212 are eight separate learning machine classifiers 302-309, one for each of Groups A-G and X. An optional combined learning machine classifier 310 (shown with dashed lines) receives the outputs of each of classifiers 302-309 to generate a single output which may be reported to the ordering physician or researcher, or which may be used by the cytologist for checking his or her own analysis results.

The automated karyotyping method and system of the present invention provide means for significantly improving the accuracy, repeatability and economics of karyotyping, allowing faster turnaround and greater efficiency compared to the current tedious, labor intensive approaches. The invention may be used as a stand-alone diagnostic tool (subject to regulatory approval) or may be used to supplement existing procedures, for example, to provide a preliminary screening process prior to engaging the cytologist, or as a second opinion, as a second set of "eyes", to make sure that important information was not inadvertently overlooked by a cytologist working at the end of a long shift, or to flag a sample that the cytologist may have determined to indicate the presence of an anomaly to further support that determination.

It will be readily apparent to those in the art that the various individual image processing techniques described herein may be replaced with other known appropriate image processing approaches. Accordingly, the invention is not intended to be limited to the specific algorithms and embodiments disclosed herein.

The invention claimed is:

1. A method for computer-assisted karyotyping, comprising:
    inputting a digitized image of metaphase chromosomes into a processor comprising an image processing module and a classifier module, wherein the image processing module comprises:
    a segmenting function adapted for segmenting the digitized image for extracting individual chromosome images, wherein the segmenting function comprises measuring a contour of a chromosome border to detect extremes corresponding to telomeres and centromeres;
    a bend correcting function adapted to straighten images of chromosomes that are bent or curved, wherein the bend correction function comprises an algorithm adapted to conformally map an ideal chromosome to the individual chromosome image;
    a feature selection function adapted for distinguishing between chromosome bands;
    wherein the classifier module generates a classification of the image as normal or abnormal and generates an output therefrom.

2. The method of claim 1, wherein the classifier module comprises at least one kernel-based learning machine.

3. The method of claim 2, wherein the classifier module comprises a plurality of kernel-based learning machines, wherein each kernel-based learning machine classifies a different group of chromosomes.

4. The method of claim 3, wherein the classifier module further comprises a combined kernel-based learning machine for receiving an output of each of the plurality of kernel-based learning machines to generate a combined result for all chromosomes.

5. The method of claim 2, wherein the kernel-based learning machine is a support vector machine.

6. The method of claim 1, wherein the image processing module further comprises:
    a medial axis transform function for generating a topological skeleton corresponding to a chromosome image.

7. The method of claim 1, wherein the feature selection function comprises one or more functions selected from the group consisting of Fourier analysis, wavelet transform and 3D distance function.

8. A system for computer-assisted karyotyping, comprising:
    a data storage device for receiving and storing digitized images of metaphase chromosomes;
    a processor in communication with the data storage device comprising an image processing module and a classifier module, wherein the image processing module comprises:
    a segmenting function adapted for segmenting the digitized image for extracting individual chromosome images, wherein the segmenting function comprises measuring a contour of a chromosome border to detect extremes corresponding to telomeres and centromeres;
    a bend correcting function adapted to straighten images of chromosomes that are bent or curved, wherein the bend correction function comprises an algorithm adapted to conformally map an ideal chromosome to the individual chromosome image;
    a feature selection function adapted for distinguishing between chromosome bands;
    an output device in communication with the processor for displaying an output comprising a classification of the image as normal or abnormal.

9. The system of claim 8, wherein the classifier module comprises at least one kernel-based learning machine.

10. The system of claim 9, wherein the kernel-based learning machine is a support vector machine.

11. The system of claim 9, wherein the classifier module comprises a plurality of kernel-based learning machines, wherein each kernel-based learning machine classifies a different group of chromosomes.

12. The system of claim 9, wherein the classifier module further comprises a combined support vector machine for receiving an output of each of the plurality of support vector machine to generate a combined result for all chromosomes.

13. The system of claim 8, wherein the image processing module further comprises:
    a medial axis transform function for generating a topological skeleton corresponding to a chromosome image.

14. The system of claim 8, wherein the feature selection function comprises one or more functions selected from the group consisting of Fourier analysis, wavelet transform and 3D distance function.

15. The system of claim 8, further comprising storing the output in the data storage device.

16. A non-transitory machine-readable medium comprising a plurality of instructions that, in response to being executed, result in a computing system executing an automated karyotyping process, comprising:
    receiving a digitized image of metaphase chromosomes into a processor comprising an image processing module and a classifier module, wherein the image processing module comprises:
    a segmenting function adapted for segmenting the digitized image for extracting individual chromosome images, wherein the segmenting function comprises measuring a contour of a chromosome border to detect extremes corresponding to telomeres and centromeres;
    a bend correcting function adapted to straighten images of chromosomes that are bent or curved, wherein the bend correction function comprises an algorithm adapted to conformally map an ideal chromosome to the individual chromosome image;
    a feature selection function adapted for distinguishing between chromosome bands;
    classifying the processed image from the image processing module to separate normal and abnormal; and
    outputting a report to a display device, the report comprising a classification of the image as normal or abnormal.

17. The non-transitory machine-readable medium of claim 16, wherein the classifier module comprises at least one kernel-based learning machine.

18. The non-transitory machine-readable medium of claim 17, wherein the kernel-based learning machine is a support vector machine.

19. The non-transitory machine-readable medium of claim 15, wherein the classifier module comprises a plurality of kernel-based learning machines, wherein each kernel-based learning machine classifies a different group of chromosomes.

20. The non-transitory machine-readable medium of claim 16, wherein the classifier module further comprises a combined kernel-based learning machine for receiving an output of each of the plurality of kernel-based learning machines to generate a combined result for all chromosomes.

21. The non-transitory machine-readable medium of claim 16, wherein the image processing module further comprises:
   a medial axis transform function for generating a topological skeleton corresponding to a chromosome image.

22. The non-transitory machine-readable medium of claim 16, wherein the feature selection function comprises one or more functions selected from the group consisting of Fourier analysis, wavelet transform and 3D distance function.

23. The method of claim 1, wherein the bend correcting function comprises polynomial least squares fitting.

24. The system of claim 8, wherein the bend correcting function comprises polynomial least squares fitting.

25. The non-transitory machine-readable medium of claim 16, wherein the bend correcting function comprises polynomial least squares fitting.

* * * * *